(12) United States Patent
Klein

(10) Patent No.: US 11,850,826 B2
(45) Date of Patent: Dec. 26, 2023

(54) LAMINATED PANE COMPRISING MULTIPLE FUNCTIONAL ELEMENTS AND A BUS BAR ON A BARRIER FILM

(71) Applicant: SAINT-GOBAIN GLASS FRANCE, Courbevoie (FR)

(72) Inventor: Marcel Klein, Baesweiler (DE)

(73) Assignee: SAINT-GOBAIN GLASS FRANCE, Courbevoie (FR)

( * ) Notice: Subject to any disclaimer, the term of this patent is extended or adjusted under 35 U.S.C. 154(b) by 0 days.

(21) Appl. No.: 17/790,355

(22) PCT Filed: Feb. 9, 2021

(86) PCT No.: PCT/EP2021/053045
§ 371 (c)(1),
(2) Date: Jun. 30, 2022

(87) PCT Pub. No.: WO2021/165093
PCT Pub. Date: Aug. 26, 2021

(65) Prior Publication Data
US 2023/0042594 A1  Feb. 9, 2023

(30) Foreign Application Priority Data
Feb. 19, 2020  (EP) .................................... 20158129

(51) Int. Cl.
*B32B 17/10* (2006.01)
*B32B 3/04* (2006.01)
(Continued)

(52) U.S. Cl.
CPC .......... *B32B 17/10504* (2013.01); *B32B 3/04* (2013.01); *B32B 3/085* (2013.01);
(Continued)

(58) Field of Classification Search
CPC ..... B32B 17/10504; B32B 3/04; B32B 3/085; B32B 17/10036; B32B 17/10532;
(Continued)

(56) References Cited

U.S. PATENT DOCUMENTS 8,551,603 B2  10/2013  Thompson
2013/0141656 A1*  6/2013  Kujawa ............. B32B 17/10504
264/1.24

(Continued)

FOREIGN PATENT DOCUMENTS

DE  10 2008 026339 A1  12/2009
DE  20 2019 100577 U1  3/2019
(Continued)

OTHER PUBLICATIONS

International Search report as issued in International Patent Application No. PCT/EP2021/053045, dated Mar. 24, 2021.

*Primary Examiner* — Donald L Raleigh
(74) *Attorney, Agent, or Firm* — Pillsbury Winthrop Shaw Pittman LLP

(57) ABSTRACT

A laminated pane, includes an outer pane, an inner pane, and at least two intermediate layers, wherein at least two separate functional elements with electrically controllable optical properties are arranged in a plane between the two intermediate layers, wherein on two opposite sides of each functional element, an inner bus bar is connected in each case to the respective functional element and at least one of the two opposite sides of each functional element is sealed by two PET barrier films, which are partly arranged between an intermediate layer and the functional element, wherein attached on one of the PET barrier films is at least one outer bus bar that is connected via an electrically conducting connection to the inner bus bar of a functional element, in
(Continued)

Figure 1:
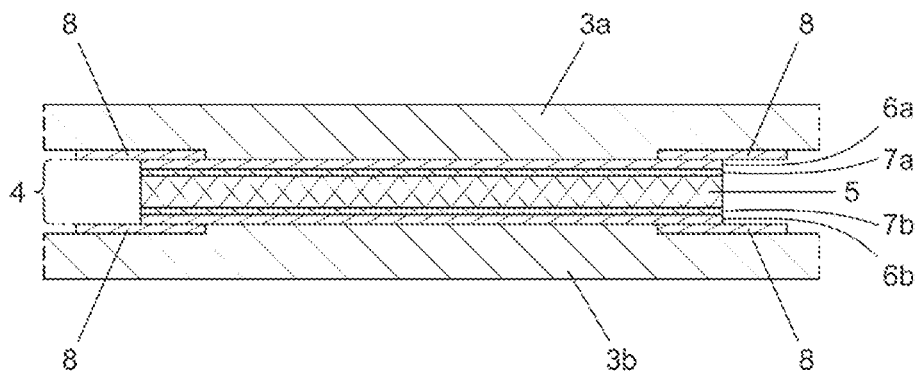

order to electrically control the functional element separately from the other functional element or elements.

20 Claims, 3 Drawing Sheets

(51) Int. Cl.
| | |
|---|---|
| B32B 3/08 | (2006.01) |
| B32B 27/08 | (2006.01) |
| B32B 27/30 | (2006.01) |
| B32B 27/36 | (2006.01) |
| B32B 27/40 | (2006.01) |
| G02F 1/1334 | (2006.01) |
| G02F 1/1339 | (2006.01) |
| G02F 1/1343 | (2006.01) |
| B60J 1/00 | (2006.01) |

(52) U.S. Cl.
CPC .... *B32B 17/10036* (2013.01); *B32B 17/1077* (2013.01); *B32B 17/10532* (2013.01); *B32B 17/10761* (2013.01); *B32B 17/10779* (2013.01); *B32B 17/10788* (2013.01); *B32B 17/10807* (2013.01); *B32B 27/08* (2013.01); *B32B 27/30* (2013.01); *B32B 27/306* (2013.01); *B32B 27/36* (2013.01); *B32B 27/40* (2013.01); *G02F 1/1334* (2013.01); *G02F 1/1339* (2013.01); *G02F 1/134309* (2013.01); *B32B 2274/00* (2013.01); *B32B 2307/732* (2013.01); *B32B 2419/00* (2013.01); *B32B 2605/006* (2013.01); *B60J 1/00* (2013.01)

(58) Field of Classification Search
CPC .......... B32B 17/10761; B32B 17/1077; B32B 17/10779; B32B 17/10788; B32B 17/10807; B32B 27/08; B32B 27/30; B32B 27/306; B32B 27/36; B32B 27/40; G02F 1/1334; G02F 1/1339; G02F 1/134309

See application file for complete search history.

(56) References Cited

U.S. PATENT DOCUMENTS

| | | |
|---|---|---|
| 2016/0282645 A1 | 9/2016 | Wang et al. |
| 2018/0173035 A1 | 6/2018 | Port et al. |

FOREIGN PATENT DOCUMENTS

| | | |
|---|---|---|
| EP | 0 876 608 B1 | 4/2002 |
| JP | S62-019631 U | 2/1987 |
| JP | 2012-503123 A | 2/2012 |
| JP | 2016-080770 A | 5/2016 |
| WO | WO 2011/033313 A1 | 3/2011 |
| WO | WO 2018/188844 A1 | 10/2018 |
| WO | WO 2019/166155 A1 | 12/2019 |
| WO | WO 2019/238520 A1 | 12/2019 |
| WO | WO 2019/238521 A1 | 12/2019 |

* cited by examiner

LAMINATED PANE COMPRISING MULTIPLE FUNCTIONAL ELEMENTS AND A BUS BAR ON A BARRIER FILM

CROSS-REFERENCE TO RELATED APPLICATIONS

This application is the U.S. National Stage of PCT/EP2021/053045, filed Feb. 9, 2021, which in turn claims priority to European patent application number 20158129.5 filed Feb. 19, 2020. The content of these applications are incorporated herein by reference in their entireties.

The invention relates to a laminated pane comprising functional elements with electrically controllable optical properties, a method for producing the laminated pane, and the use of the laminated pane.

Laminated panes with electrically controllable functional elements are known per se. The optical properties of the functional elements can be changed by an applied electrical voltage.

SPD functional elements (SPD=suspended particle device), known, for example, from EP 0876608 B1 and WO 2011033313 A1, are one example of such functional elements. The transmittance of visible light through SPD functional elements can be controlled by the applied voltage.

PDLC functional elements (PDLC=polymer dispersed liquid crystal), known, for example, from DE 102008026339 A1, are another example. The active layer contains liquid crystals that are incorporated into a polymer matrix. When no voltage is applied, the liquid crystals are oriented in a disorderly manner, resulting in strong scattering of the light passing through the active layer. When a voltage is applied to the surface electrodes, the liquid crystals align themselves in one common direction and the transmittance of light through the active layer is increased.

PNLC functional elements (PNLC=polymer network liquid crystal) are another example. The active layer contains liquid crystals that are incorporated into a polymer network, with the mode of operation otherwise analogous to that of PDLC functional elements.

SPD, PDLC, and PNLC functional elements are commercially available as a functional element, with the active layer and the surface electrodes required for applying a voltage arranged between two carrier films. During production of the laminated pane, the functional element is cut out of a functional element in the desired size and shape and inserted between the films of an intermediate layer, by means of which two glass panes are laminated to one another to form the laminated pane. The side edge of the functional element is open such that the active layer has contact via the side edge with other material of the laminated pane, e.g., from the intermediate layer, which can result in functional or optical disturbances (edge fading).

Functional elements are usually laminated in EVA, as edge fading is acceptably low. However, for the automotive sector, in particular when additional functions (dark tinted or acoustic) are desired, the use of PVB films is standard. With PVB, edge fading develops more quickly and does not stop even after a month of aging.

The polyvinyl butyral (PVB) used contains plasticizers. The plasticizer or other chemical components of the intermediate layer can diffuse into the active layer via the open edge of the functional element, possibly resulting in corrosion or degradation of the active layer. This manifests itself in particular as decoloration or discoloration of the active layer in the edge region which can negatively affect the function and the visual appearance of the functional element and result in visible aging.

To implement an edge seal that closes the edges of the functional element, a PET covering around the PDLC edge can help. However, its application is time-consuming and involves many work steps.

To avoid this problem, in WO 2019/238521 A1, WO 2019/238520 A1, and WO 2019/166155 A1, for example, during lamination, barrier films such as PET strips are attached to both sides of the PDLC edge so no plasticizer damages the PDLC. DE 20 2019 100 577 U1 discloses a laminated pane having a functional element with an edge seal.

WO 2018/188844 A1 discloses a laminated pane with a functional element with electrically controllable optical properties arranged between a first intermediate layer and a second intermediate layer, wherein at least one barrier film that has, at least in some sections, a projection beyond the functional element is arranged between the functional element and the first intermediate layer and between the functional element and the second intermediate layer.

Recently, there has been an increasing demand for laminated panes that have not just one functional element but multiple separate functional elements, Here, the additional problem arises that multiple separate bus bars that usually have to be soldered onto the films for the intermediate layers during construction of the stack for the laminated pane are required for separate control of the functional elements. This can create dust on the films stack, in particular in the vicinity of the functional element. In addition, soldering these bus bars takes a long time during lamination of the film stack.

The object of the present invention is to provide a laminated pane having at least two separate functional elements with electrically controllable optical properties that overcomes the above-described disadvantages of the prior art. In particular, the object of the invention consists in providing a laminated pane having at least two separate functional elements with electrically controllable optical properties for which additional time-consuming work steps during stack binding for applying bus bars and the associated dust formation are avoided.

The inventor has found that this object can be accomplished by combining the sealing of the sides of the functional element with the design of the bus bar assembly. This means that a PET film is used both as a carrier film for bus bars and as a protective film for the edges of the functional element.

The object of the present invention is, consequently, accomplished by a laminated pane with electrically controllable optical properties according to independent claim 1. The invention also relates to a method for producing the laminated pane with the incorporated functional elements and to the use of the laminated pane in accordance with the other independent claims. Preferred embodiments are apparent from the dependent claims.

In the method according to the invention, PET barrier films are prepared in advance before forming the stack assembly for the lamination to form the laminated pane by cutting in the right size and arranging in the film assembly for the edge sealing, as is currently customary. However, in addition, at least one bus bar is applied to a PET barrier film in advance. As result, during forming of the assembly, only a connecting of this bus bar/these bus bars on the PET barrier film to the bus bars of the functional elements is necessary.

The advantage is that less soldering has to be done during construction of the assembly for lamination since the required additional bus bars are already applied and do not have to be time-consumingly applied to the film for the intermediate layer during the course of forming the assembly. This saves time and reduces dust formation.

Another advantage is that the bus bars can even be printed on PET films. In contrast, applying the bus bars on PVB films in accordance with the prior art by printing is difficult.

The invention is explained in more detail in the following. The statements are made relative to the laminated pane according to the invention or the method for producing the laminated pane but always refer, to the extent applicable, to both the laminated pane itself and the method, unless expressly stated otherwise.

According to the invention, a laminated pane is provided that comprises an outer pane, an inner pane, and at least two intermediate layers between the outer pane and the inner pane.

wherein at least two separate functional elements with electrically controllable optical properties are arranged in a plane between the two intermediate layers, the functional elements comprise, in each case, in this order, a first carrier film, a first surface electrode, an active layer, a second surface electrode, and a second carrier film, on two opposite sides of each functional element, an inner inner bus bar is connected in each case to the first surface electrode or to the second surface electrode of the respective functional element, at least one of the two opposite sides of each functional element is sealed at least along a partial region by two polyethylene terephthalate (PET) barrier films, with one PET barrier film arranged partly between one intermediate layer and an edge region of the first carrier film and the other PET barrier film arranged partly between the other intermediate layer and an edge region of the second carrier film, wherein at least one outer bus bar is attached on one of the PET barrier films, which outer bus bar is connected via an electrically conducting connection to the inner bus bar of a functional element, in order to electrically control the functional element separately from the other functional element or elements.

In the laminated pane according to the invention, at least two separate functional elements with electrically controllable optical properties are incorporated between the intermediate layers. The number N of the separate functional elements in a plane between the intermediate layers can, for example, be in the range from 2 to 50, preferably 2 to 30.

The at least two separate functional elements are arranged in a plane of the laminated pane. They are advantageously arranged in a row, with in each case, one side of the functional elements arranged aligned with one another in a line and with the side of the functional elements opposite thereto arranged aligned with one another in a line.

Figure 3:
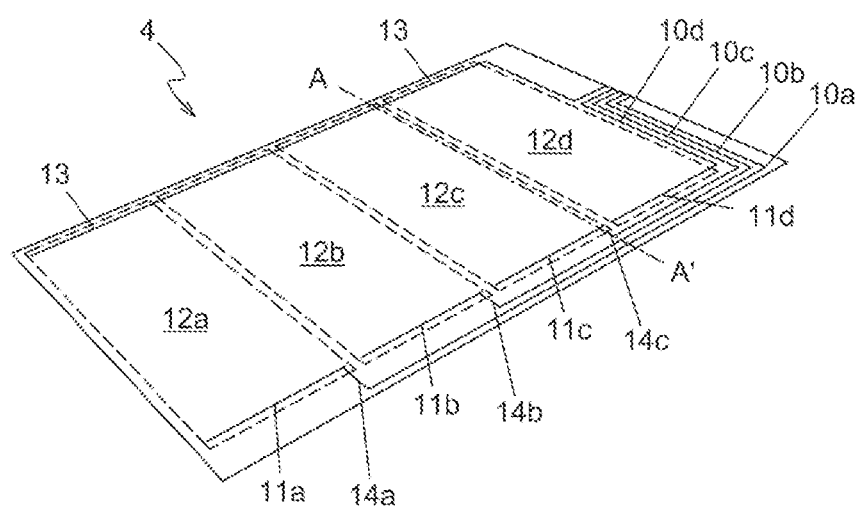

The sides and the opposite sides that are arranged in alignment are, in particular, the two opposite sides of each functional element, which are, in each case, connected to a surface electrode on an inner bus bar. FIG. 3 shows, for example, an aligned arrangement of the opposite sides. Optionally, it is conceivable for the functional elements to be arranged in more than one such row.

The at least two functional elements with electrically controllable optical properties are, in each case, functional elements comprising, in this order, a first carrier film, a first surface electrode, an active layer, a second surface electrode, and a second carrier film.

Active layers for the functional elements are known to the person skilled in the art. The active layer has variable optical properties that can be controlled by an electrical voltage applied to the active layer. In the context of the invention, "electrically controllable optical properties" means, in particular, those properties that are continuously controllable, but equally also those that can be switched between two or more discrete states. Said optical properties relate, in particular, to light transmittance and/or scattering behavior.

The functional film includes surface electrodes for applying the voltage to the active layer, which are arranged between the carrier films and the active layer. A surface electrode is arranged between the active layer and the first carrier film, and a surface electrode is arranged between the active layer and the second carrier film. The surface electrodes can be the same or different in terms of composition and/or thickness. The surface electrodes are usually the same.

The surface electrodes are preferably designed as transparent, electrically conductive layers. The surface electrodes preferably contain at least a metal, a metal alloy, or a transparent conducting oxide (TOO). Examples of transparent conducting oxides (TCOs) include tin-doped indium oxide (ITO, also referred to as indium tin oxide), antimony-doped and fluorine-doped tin oxide ($SnO_2$:F), gallium-doped zinc oxide, or aluminum-doped zinc oxide (ZnO: Al), with ITO being preferred. The thickness of the electrically conducting layers based on these transparent conducting oxides (TCOs) is preferably in the range from 10 nm to 2 micrometers ($\mu$m), more preferably 30 nm to 500 nm, and, in particular 50 to 100 nm.

The electrically conductive layer can also be a metal layer, preferably a thin layer or a stack of thin layers that include metal layers. Here, the term "metal" also includes metal alloys. Suitable metals are, for example, Ag, Al, Pd, Cu, Pd, Pt, In, Mo, Au, Ni, Cr, W, or alloys thereof. These metal coatings are referred to as TCCs (transparent conductive coating), Typical thicknesses of the individual layers are in the range from 2 to 50 nm.

Typically, the surface electrodes are implemented in the form of an electrically conductive coating on the carrier film. The side of the carrier film with the electrically conductive coating forming the surface electrode then faces the active layer.

The functional elements further include a first carrier film and a second carrier film. The first and second carrier films are, in particular polymeric or thermoplastic films. The first and second carrier films can be the same or different in terms of their composition and/or thickness. Typically, the two carrier films are of the same composition. The following statements regarding carrier films refer to both the first carrier film and the second carrier film.

In particular, the carrier films contain or are made of a thermoplastic material. The thermoplastic material can be a thermoplastic polymer or a mixture of two or more thermoplastic polymers. In addition to the thermoplastic material, the carrier film can also include additives, such as plasticizers. The thermoplastic material of the carrier films is preferably polyethylene terephthalate (PET), as is customary in commercially available functional elements.

The thermoplastic material of the carrier film can also contain or be made of mixtures of PET with other thermoplastic polymers and/or copolymers of PET. The thermoplastic material of the carrier film can, for example, also contain or be made of PU, polypropylene, polycarbonate, polymethyl methacrylate, polyacrylate, polyvinyl chloride, polyacetate resin, fluorinated ethylene propylenes, polyvinyl fluoride, and/or ethylene tetrafluoroethylene.

The thickness of each carrier film is preferably in the range from 0.03 mm to 0.4 mm, more preferably from 0.04 mm to 0.2 mm.

In a preferred embodiment, the functional elements are in each case independently selected from a PDLC functional element, a PNLC functional element, or an SPD functional element, with the functional elements particularly preferably being PDLC functional elements. The mode of operation of functional elements is known per se to the person skilled in the art.

The active layer of a PDLC functional element contains liquid crystals that are incorporated into a polymer matrix. When no voltage is applied to the surface electrodes, the liquid crystals are oriented in a disorderly manner, resulting in strong scattering of the light passing through the active layer. When a voltage is applied to the surface electrodes, the liquid crystals align themselves in one common direction and the transmittance of light through the active layer is increased.

The active layer of a PNLC functional element contains liquid crystals that are incorporated into a polymer network. Otherwise, the functional principal is similar to that of the PDLC functional element.

The active layer of an SPD functional element contains suspended particles, whereby the absorption of light by the active layer can be changed by applying a voltage to the surface electrodes.

The functional element can be in the form of rolled goods. Pieces of suitable size can then be cut out of the rolled goods. The area of the suitably cut functional element according to the invention can vary widely and thus be adapted to the requirements in the individual case. The thickness of the functional element can, for example, be in the range from 0.09 mm to 0.8 mm, e.g., 0.11 to 0.41 mm.

In each case, on two opposite sides of each functional element, an inner bus bar is connected to the first surface electrode or to the second surface electrode of the respective functional element.

The inner bus bars and the outer bus bars described below are the usual bus bars used for contact to the electrical power supply and for distribution of the electrical current to a functional element when incorporating the functional element in laminated panes. Bus bars are also referred to as collection conductors and are known to the person skilled in the art.

The inner bus bars are connected to the surface electrodes by cutting out a carrier film, a surface electrode, and the active layer along one edge region of the respective side of the functional element such that other surface electrode with the associated carrier film protrudes. The inner bus bar is arranged on the protruding surface electrode. On the opposite side of the respective functional element, another inner bus bar is connected to the other surface electrode in a corresponding manner.

A bus bar is electrically conductive. It can be formed, for example, by an electrically conductive metal strip or an electrically conductive coating, for example, a silver-containing print. Here, metal includes metal alloys. A strip of copper or a copper alloy is, for example, suitable. The bus bar implemented as a metal strip is usually connected to the surface electrode via an electrically conductive intermediate layer, e.g., a silver layer.

The laminated pane comprises an inner pane and an outer pane. The inner pane and the outer pane can be flat or curved panes. The panes can be made of inorganic glass and/or organic glass (plastic). The inner pane and the outer pane can, for example, independently of one another, be made of flat glass, quartz glass, borosilicate glass, soda lime glass, aluminosilicate glass, polycarbonate and/or polymethacrylate. The inner pane and the outer pane are preferably made of soda lime glass. The inner pane and the outer pane have, for example, independently of one another, a thickness in the range from 0.4 to 5.0 mm, e.g., 1 to 3 mm, more preferably 1.6 to 2.5 mm.

The inner pane and/or the outer pane can have other suitable coatings known per se, e.g., nonstick coatings, tinted coatings, anti-reflective coatings, anti-scratch coatings, or low-E coatings. One example of coated glass is low-E (low-emissivity) glass.

The at least two intermediate layers are, in particular, formed from polymeric films, usually thermoplastic films. The intermediate layers can be the same or different in terms of composition and/or thickness. The intermediate layers can be formed by commercially available laminating films. They are used for bonding or laminating the components of the laminated pane.

The intermediate layer can contain, for example, polyvinyl butyral (PVB), ethylene vinyl acetate, polyurethane, polypropylene, polyacrylate, polyethylene, polycarbonate, polymethyl methacrylate, polyvinyl chloride, polyacetate resin, casting resin, acrylate, fluorinated ethylene propylene, polyvinyl fluoride, and/or ethylene tetrafluoroethylene and/or a mixture and/or a copolymer thereof.

In a preferred embodiment, the at least two intermediate layers are, in each case, independently, formed from a polyvinyl butyral (PVB) film, an ethylene vinyl acetate (EVA) film, or a thermoplastic polyurethane (TPU) film. In a preferred embodiment, the at least two intermediate layers are formed from PVB films. The films used to form the intermediate layers, in particular the PVB can contain a plasticizer.

The at least two films for forming the intermediate layers preferably have, in each case, independently, a thickness in the range from 0.03 mm to 0.9 mm, particularly preferably 0.3 mm to 0.6 mm, and are preferably PVB In the laminated pane according to the invention, one of the two opposite sides of each functional element is sealed at least along a partial region by two polyethylene terephthalate (PET) barrier films. One PET barrier film is arranged partly between one intermediate layer and an edge region of the first carrier film, and the other PET barrier film is arranged partly between the other intermediate layer and an edge region of the second carrier film. It goes without saying that, here, the opposite sides refer to the sides of the functional elements that are connected to the inner bus bars.

The PET barrier films are PET films, as already described above. The PET films are common, commercially available films. The PET barrier films have, for example, in each case, independently, a thickness in the range from 0.02 mm to 0.2 mm, more preferably from 0.04 mm to 0.15 mm.

Here, the sealing of one side of a functional element means that the side edge of the functional element, in particular the open side of the active layer, is covered by the PET film, as a result of which the active layer of the functional element is protected against the materials of the intermediate layer, such as a PVB intermediate layer, e.g., plasticizers contained therein, even during the lamination process (high-temperature and pressure). The sides are sealed at least along a partial region, in other words, they can be partially sealed or sealed over the entire length. Usually, the side is sealed over the entire length, with the sealing possibly optionally being interrupted, for example, for connectors or electrical lines.

The PET barrier films for the edge sealing of the functional elements can be fixed directly and simply on the functional element during construction of the assembly, by detaching the film for the intermediate layer from the carrier film in an edge region of the functional element and folding it back and, after inserting a part of the PET barrier film, placing the folded back film back onto the inserted part of the PET barrier film. Of course, the PET barrier film can also be positioned in the correct place on the corresponding subassembly before applying the film for the intermediate layer. In this way, in the complete assembly, a part of the respective PET barrier film is positioned between the film of the intermediate layer and a carrier film, while the other part protrudes beyond the functional element.

No adhesives or adhesive layers are required for fixation for attaching the PET barrier films or for the subsequent sealing in the laminated pane. However, it is also possible to use adhesives or adhesive layers for fixing the PET barrier films, e.g., for the PET carrier film, on which at least one outer bus bar is attached. Since, during construction, the outer bus bar is connected to the inner bus bar by means of a connection, this can be sufficient for the fixation.

On one or both opposite sides of each functional element, which are connected to inner bus bars, two PET barrier films are fixed in this way on the upper and lower side of the functional elements along an edge region.

The length of the PET barrier film is the dimension along the side of the functional elements to which the PET barrier film is attached. The width of the PET barrier film is correspondingly transverse to the length or transverse to the side of the PET barrier film. The width of the PET barrier film is identified with Bk or Bl in FIG. 2.

The length of the PET barrier film can vary. For example, two PET barrier films can be used in each case for each side of a functional element. Alternatively, it is possible to use two PET barrier films together for the sides of all functional elements that are in alignment. The latter is usually preferred for practical reasons. The PET barrier film can, optionally, have cutouts in one or more places, e.g., for electrical lines or connectors.

As explained in more detail below, the protruding part of the PET barrier film folds during lamination, resulting in the covering of the active layer or the sealing of the side of the functional elements.

The width of the PET barrier film is intended, on the one hand, to enable sufficient fixing of the PET barrier film between the carrier film and the film for the intermediate layer and, on the other, to enable sealing with the help of the protruding part. The width of the part of the PET barrier film that protrudes from the functional element should be sufficient to be able to cover the side edge of the functional element.

If two PET barrier films are arranged on an edge region or a side of the functional element, this applies to the sum of the widths of the parts of the two PET barrier films that protrude from the functional element. For reliable coverage, a margin must be taken into account in the width, since the PET barrier films do not necessarily nestle flat against the side edge during lamination, but, instead, folds can result.

The PET barrier films on which at least one outer bus bar is applied also need more space for the bus bars applied, which, of course, also depends on the number of outer bus bars situated thereon. In this case, it can also be expedient for the PET barrier film without outer bus bars, which is arranged on the same side of the functional element opposite the PET barrier film with at least one outer bus bar, to have a sufficient width of the protruding part to alone seal the side of the functional element.

In a preferred embodiment, the width Bk of the PET barrier film on which there is no outer bus bar, is in the range from 5 to 50 mm, preferably 10 to 25 mm. In a preferred embodiment, the width Bl of the PET barrier film on which at least one outer bus bar is attached is in the range from 20 to 125 mm, preferably 30 to 100 mm. It goes without saying that the width of the PET barrier film with at least one outer bus bar is highly dependent on the number of outer bus bars situated thereon.

On one of the two PET barrier films that is attached on a side of the functional elements on which an inner bus bar is arranged, at least one outer bus bar is attached, which is connected to the inner bus bar of the functional element via an electrically conducting connection in order to electrically actuate the functional element separately from the other functional element(s).

In one embodiment, two or more outer bus bars are situated on the PET barrier film, with each outer bus bar connected to the inner bus bar of a respective other functional element via an electrically conducting connection.

When two or more outer bus bars are applied, the outer bus bars on the PET barrier film run parallel to one another and are spaced apart from one another in order to avoid electrical contact. The outer bus bars are, in this way; routed to a connector where each outer bus bar and thus each functional element can be connected separately to a power supply.

Each outer bus bar is connected to the inner bus bar of a functional element via an electrically conducting connection. The connection can also be a bus bar or a solder connection. The connection points of the connection to the inner and outer bus bar are advantageously a region at one end of the inner bus bar (in particular the end facing the connector for the bus bars) and a region at one end of the outer bus bar (in particular, the end facing away from the connector for the bus bars). In this way; a bus bar with a kink is ultimately formed, allowing the inner bus bar of each functional element to be able to be separately routed to a connector via the outer bus bar.

On the side on which the carrier film with the outer bus bar is situated, the inner bus bar of a functional element can be routed directly to the connector for the bus bars. It is, consequently, preferred that if the number of separate functional elements is N, the number of outer bus bars on the PET barrier film is (N−1). For example, if there are 4 separate functional elements in the laminated pane, the number of outer bus bars on the PET barrier film is preferably 3.

Whereas on one side of the functional element, the inner bus bars are routed separately to the connector via the outer bus bars on the PET, the inner bus bars on the side of the functional element opposite the side on which the at least one outer bus bar is attached on the PET barrier film are usually electrically conductingly connected to one another to form a common bus bar. Separate routing is not required. The common bus bar on this side is likewise routed to the connector which can be connected to a power supply.

In addition to the at least one side of each functional element that is sealed using the PET barrier films, wherein the at least one outer collecting foil is applied to one of the barrier films, at least one further side of each functional element, in particular the opposite side, on which the other inner bus bars or the common bus bar are situated, or preferably all sides of each functional element can be sealed using PET barrier films, wherein for each further side, one or two PET barrier films are arranged partly between the one intermediate layer and an edge region of the first carrier film of this side and/or between the other intermediate layer and an edge region of the second carrier film of this side.

For sealing these other sides, one or two PET barrier films can be present along one edge region of the functional elements. Whereas one PET barrier film can suffice for sealing, it is usually preferred for two PET barrier films to be attached along an edge region of the functional elements.

In one embodiment, in each case, one or two PET barrier films are attached on each side of the functional elements to seal the side, with PET barrier films preferred.

The invention also relates to a method for producing the above-described laminated pane according to the invention, wherein the method comprises the following steps:

a) Providing an assembly, comprising, in this order, the outer pane, a film for an intermediate layer, at least two functional elements with electrically controllable optical properties, which are positioned separately from one another in a plane, a film for a further intermediate layer, and the inner pane, wherein the functional elements comprise, in each case, in this order, a first carrier film, a first surface electrode, an active layer, a second surface electrode, and a second carrier film, on two opposite sides of each functional element, in each case, an inner bus bar is connected to the first surface electrode or to the second surface electrode of the respective functional element, wherein, during the arranging at one of the two opposite sides of each functional element, two PET barrier films are arranged between the one intermediate layer and an edge region of the first carrier film or between the other intermediate layer and an edge region of the second carrier film such that the PET barrier films protrude beyond the carrier films on this side, wherein at least one outer bus bar is attached on the protruding part of a PET barrier film, wherein, in a subassembly, which comprises the carrier film with at least one outer bus bar and the at least two functional elements, an inner bus bar of a functional element is electrically conductingly connected to the outer bus bar by means of a connection, and b) Connecting the outer pane and the inner pane by laminating the assembly, wherein the bonding of the pane composite is obtained by the films of the intermediate layers and the respective side of the functional elements is sealed by the PET barrier films.

Statements concerning the method according to the invention and the components used for it have already been provided in part above in the description of the laminated pane, to which reference is made.

In process step a), an assembly of the outer pane, a film for an intermediate layer, at least two functional elements with electrically controllable optical properties, a film for a further intermediate layer, and the inner pane is formed by stacking them in this order.

The functional elements can be cut out of a larger functional element in a suitable size, e.g., with a knife or by means of a laser. The functional elements are preferably positioned such that they do not extend all the way to one of the side edges of the assembly or of the layer stack.

The at least two functional elements are situated separately from one another in a plane. As explained, the at least two functional elements are preferably arranged in a row such that the opposite sides of the functional elements, on which the inner bus bars are situated, are in each case positioned in alignment with one another.

During the arrangement on one of the two opposite sides of each functional element, a PET barrier film is arranged between one intermediate layer and an edge region of the first carrier film and another PET barrier film is arranged between the other intermediate layer and an edge region of the second carrier film such that the PET barrier films protrude beyond the carrier films on this side.

At least one outer bus bar is situated on one of these PET barrier films on the protruding part. It goes without saying that the barrier film must be appropriately positioned. For better fixation, the PET barrier film with at least one outer bus bar can optionally be additionally fixed by adhesive bonding.

A particular advantage of the present invention consists in that the outer bus bars need not be applied on the PET barrier film during the construction of the assembly for the laminated pane, but, instead, this can already be done in advance. The at least one outer bus bar is preferably applied on the PET barrier film by soldering or printing.

The positioning or fixing of the PET barrier film in the assembly has been described above. As a result, in both PET barrier films, one part of the PET barrier film is positioned or fixed along an edge region between a film for the intermediate layer and a carrier film, while the other part protrudes out of the functional element.

When a subassembly has been formed in which the carrier film has been positioned with at least one outer bus bar and the at least two functional elements, at least one inner bus bar of a functional element is electrically conductingly connected to the outer bus bar by means of a connection. The connection can be done by a solder connection, or, as a connection, a bus bar can be soldered to the inner bus bar and the outer bus bar. In contrast to the prior art, far fewer soldering operations are needed during construction of the assembly.

In process step b), the outer pane and the inner pane are joined to one another by laminating the assembly. In a preferred embodiment, negative pressure is applied to the assembly at least intermittently during lamination. During lamination, the at least two films for the intermediate layers form bonding layers that bring about a bond between the outer pane and the inner pane.

Laminating usually includes deaeration or evacuation to form a pre-laminate and final lamination of the pre-laminate to form the laminated pane. The at least intermittent application of a negative pressure or vacuum to the assembly can occur during deaeration and/or during the final lamination, preferably during deaeration or evacuation.

The deaeration can be carried out according to the known methods. The final lamination is preferably carried out under the action of heat and pressure or vacuum to obtain the finished laminated pane. The final lamination can be carried out, for example, preferably at temperatures from 80 to 150° C., preferably 105 to 145° C., and an autoclave pressure of about 10 to 14 bar.

During lamination of the assembly, a seal is formed by the PET barrier film incorporated along at least one region of the side or side edge of the functional element, preferably along the entire side. The part of the PET barrier films protruding from the functional element overlaps, in particular, at least the active layer, by which means the respective side of the functional element is sealed. As stated, in the case of the side on which the PET carrier film is positioned with the at least one outer bus bar, the sealing can be carried out, optionally, completely or substantially by the second PET carrier film on this side without an outer bus bar.

The overlying positioning of the protruding parts of the PET barrier film on the side or side edge of the functional element is supported in particular by the at least intermittent application of a negative pressure or evacuation to the assembly. The clamping of the PET barrier film between the carrier film and the PVB suffices initially for positioning; it is then fixed, pressed, and deaerated by the evacuation.

The protruding parts of the PET barrier film can rest smoothly or in folded form on the side edge in the direction toward the active layer to form the seal. The folds can be irregular. The active layer of functional film is thus effectively protected against the material of the intermediate layer such that no diffusion can occur between this material and the active layer and degradation of the active layer is prevented.

In a preferred embodiment, during the provision of the assembly, in addition to the arranging of the PET barrier films on one side of each functional element, at least on one further side of each functional element, or preferably on all sides of each functional element, one or two PET barrier films are arranged in each case between the one intermediate layer and an edge region of the first carrier film of this side and/or between the other intermediate layer and an edge region of the second carrier film of this side such that the one or two PET barrier films on this side protrude beyond the carrier films, as a result of which the respective side is sealed during the subsequent lamination.

The region of the sides of the functional elements sealed according to the invention can include the entire perimetral side edge, in particular in the region of the active layer, optionally with the exception of any locations where an electrical conductor is routed out of the functional element via the side edge for the electrical contacting of the surface electrodes.

In a preferred embodiment, the inner bus bars on the side of the functional elements that are opposite the side on which the at least one outer bus bar is attached to the PET barrier films are connected to form a single bus bar. This can be done by soldering, with the inner bus bars connected to one another with an electrically conducting connection.

In the regions that are free of the functional elements, films that correspond to the films for the intermediate layers can, optionally, be incorporated as intermediate parts as compensation. All statements in this regard also apply to the film for the intermediate parts. Accordingly, the films for the intermediate parts are preferably PVB films. The films for the intermediate parts can be implemented in the form of a frame. The functional elements can then be positioned in the cutouts of the frame-like film parts.

For electrical contacting, electrical cables are usually connected to the bus bars of the functional elements and guided out of the assembly via the side edge.

Preferably, the laminated pane according to the invention can be obtained by the described method according to the invention.

The invention further relates to the use of the laminated pane according to the invention with electrically controllable optical properties as a window pane of buildings, of spaces in the interior of buildings or of vehicles, in particular as a rear pane, side pane, windshield, or roof panel of motor vehicles, such as passenger cars, or transport vehicles, such as buses, trains, and ships.

The invention is explained in greater detail in the following using exemplary embodiments and accompanying figures, which are not intended to limit the invention in any way. The accompanying figures are schematic representations and are not to scale.

Figure 2:
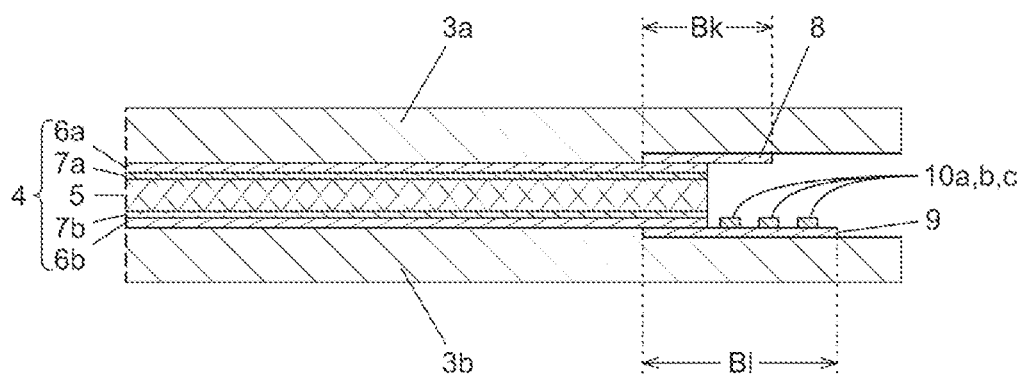
Figure 4:
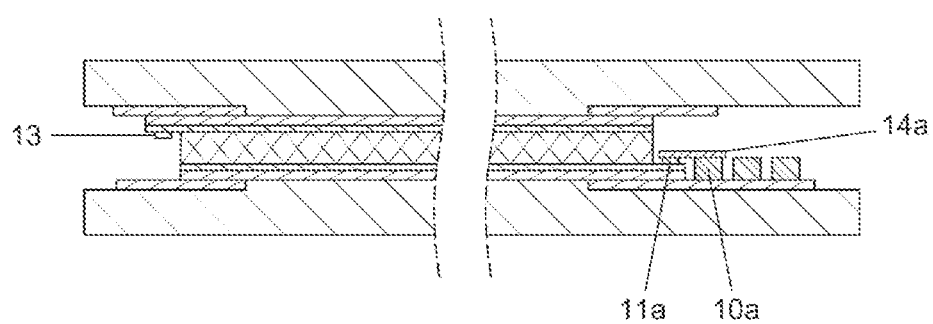
Figure 5:
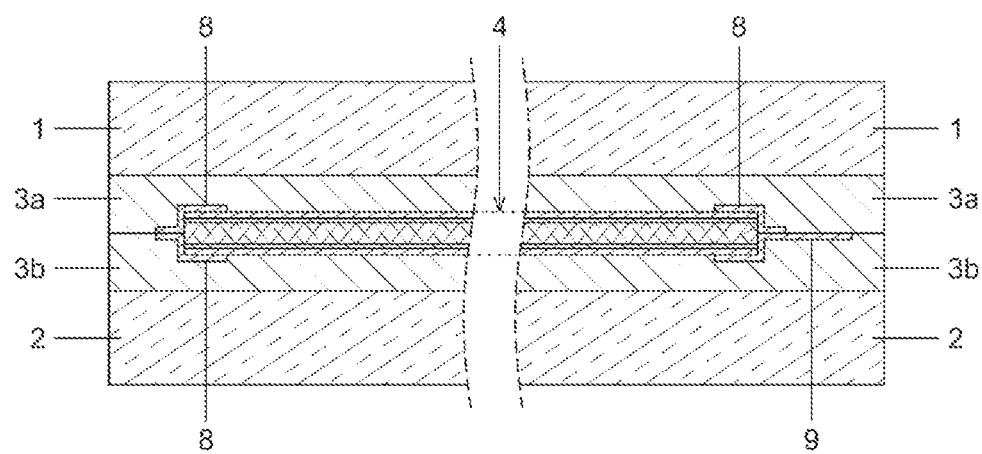

They depict:

FIG. 1 a detail of a laminated pane with electrically controllable optical properties according to the prior art in cross-section, FIG. 2 a detail of a laminated pane according to the invention with electrically controllable optical properties in cross-section, FIG. 3 a detail of the laminated pane according to the invention of FIG. 2 in plan view, FIG. 4 a detail of the laminated glass pane according to the invention of FIG. 2 in cross-section FIG. 5 the laminated pane according to the invention of FIG. 2 in the laminated state in cross-section.

FIGS. 1 to 4 depict the arrangement of the laminated panes schematically for reasons of clarity before lamination and omitting the glass panes.

FIG. 1 depicts a laminated pane with electrically controllable optical properties according to the prior art in cross-ssection. The functional element 4 depicted is a PDLC functional element. The functional element is formed from a first carrier film 6*a*, a first surface electrode 7*a*, an active layer 5, a surface electrode 7*b*, and a second carrier film 6*b*, in this order.

The first and second carrier film 6*a*, 6*b* are PET films and have, for example, a thickness of approx. 0.18 mm. The carrier films are provided with an electrically conductive coating, e.g., made of ITO, facing the active layer 5 and forming the surface electrodes 7*a*, 7*b*.

The PDLC element 4 is arranged between films for the intermediate layers 3*a*, 3*b*. The intermediate layers are preferably PVB films that have, for example, a thickness of 0.38 mm.

The inner bus bars are also omitted for clarity. They are situated on the opposite sides, on which the PET barrier films 8 are arranged. The PET barrier films 8 have, for example, a thickness of 0.05 mm. One part of the PET barrier films 8 is, in each case, arranged between one of the intermediate layers 3*a*, 3*b* and one of the carrier films 6*a*, 6*b*. The other part of the PET barrier films protrudes, in each case, beyond the functional element.

FIG. 1 depicts the principle of attaching the PET barrier films only on two sides of the functional element, for better clarity. In the preferred embodiments, one or two PET barrier films are attached to all sides of the functional element.

FIG. 2 depicts a detail of a laminated pane according to the invention with electrically controllable optical properties in cross-section. The laminated pane has, with the exception of the PET barrier film 9, the same structure as the laminated pane in FIG. 1, for which reason reference is made thereto. Furthermore, only the end on one side of the laminated pane is shown. The one PET barrier film 8 has no outer bus bars.

Outer bus bars 10*a*, 10*b*, 10*c* are applied on the PET barrier film 9. The outer bus bars run parallel to one another and are spaced apart. The outer bus bars can be applied to the PET barrier film 9 by soldering or printing before the PET barrier film is incorporated into the assembly.

The width Bk of the PET barrier film 8, on which no outer bus bar is attached, can, for example, be in the range from 10 to 25 mm. The width Bl of the PET barrier film 9, on which at least one outer bus bar is attached, can, for example, be in the range from 30 to 100 mm.

FIG. 3 depicts a detail of the laminated pane according to the invention of FIG. 2 in plan view. Here, it can be seen that the laminated pane has four (4) PDLC functional elements 12a, 12b, 12c, 12d arranged in a row in a plane, wherein the opposite sides to which the inner bus bars are connected are positioned in alignment. The inner bus bar 11a of the PDLC element 12a is connected, via the connection 14a, to the outer bus bar 10a, which is applied on the PET barrier film (not shown). The outer bus bar 10a is routed to the connector for connection to the power supply. Accordingly, the inner bus bars 11b, 11c of the PDLC elements 12b, 12c are connected to the outer bus bars 10b, 10c via the connections 14b, 14c and routed to the connector. The inner bus bar 11d of the PDLC element 12d can be routed directly to the connector without connections and outer bus bars (10d), On the opposite side of the PDLC elements, the inner bus bars are connected to form a common bus bar 13, which is also routed to the connector.

FIG. 4 depicts a detail of the laminated glass pane according to the invention of FIG. 2 in cross-section, in which the details of the bus bars are shown. The inner bus bar 13 is connected to the surface electrode of the PDLC element, whereas the inner bus bar 11a is connected to the other surface electrode of the PDLC element on the opposite side. The inner bus bar 11a is connected to the outer bus bar 10a on the PET barrier film via the connection 14a.

FIG. 5 depicts the laminated pane of FIGS. 2, 3, and 4 in cross-section and in the laminated state, i.e., as a finished laminated pane. The PVB-intermediate layers 3a and 3b, which connect the two panes, are arranged between the outer pane 1 and the inner pane 2. The PDLC element 4 is incorporated into the intermediate layers. The opposite sides of the PDLC element, on which the bus bars are arranged (not shown), are sealed by means of the PET barrier films 8, 9. In this way, the PDLC element, in particular the active layer thereof, is protected against the material of the intermediate layers 3a, 3b.

The depiction of the overlap of the PDLC side by the PET barrier films for sealing is purely schematic. The way in which the protruding parts of the two PET barrier films are folded together is usually more irregular.

LIST OF REFERENCE CHARACTERS 1 outer pane
2 inner pane
3a first intermediate layer
3b second intermediate layer
4 functional element with electrically controllable optical properties, e.g., PDLC
5 active layer
6a first carrier film
6b second carrier film
7a first surface electrode
7b second surface electrode
8 PET barrier film
9 PET barrier film for outer bus bar
10a outer bus bar for functional element 1, e.g., PDLC 1
10b outer bus bar for functional element 2, e.g., PDLC 2
10c outer bus bar for functional element 3, e.g., PDLC 3
11a inner bus bar for functional element 1, e.g., PDLC 1
11b inner bus bar for functional element 2, e.g., PDLC 2
11c inner bus bar for functional element 3, e.g., PDLC 3
11d inner bus bar for functional element 4, e.g., PDLC 4
12a functional element 1, e.g., PDLC 1
12b functional element 2, e.g., PDLC 2
12c functional element 3, e.g., PDLC 3
12d functional element 4, e.g., PDLC 4
13 common bus bar for functional elements 1-4
14a connection of inner and outer bus bar for functional element 1
14b connection of inner and outer bus bar for functional element 2
14c connection of inner and outer bus bar for functional element 3
Bk width of barrier film 8
Bl width of barrier film 9

The invention claimed is:

1. A laminated pane, comprising an outer pane, an inner pane, and at least two intermediate layers between the outer pane and the inner pane,
   wherein at least two separate functional elements with electrically controllable optical properties are arranged in a plane between the at least two intermediate layers,
   the at least two separate functional elements each comprise in each case, in this order, a first carrier film, a first surface electrode, an active layer, a second surface electrode, and a second carrier film,
   on two opposite sides of each functional element of the at least two separate functional elements, an inner bus bar is connected in each case to the first surface electrode or to the second surface electrode of the respective functional element,
   at least one of the two opposite sides of each functional element is sealed, at least along a partial region, by two polyethylene terephthalate (PET) barrier films, wherein one PET barrier film of the two PET barrier films is arranged partly between one intermediate layer of the at least two intermediate layers and an edge region of the first carrier film and the other PET barrier film of the two PET barrier films is arranged partly between the other intermediate layer of the at least two intermediate layers and an edge region of the second carrier film,
   wherein
   attached on one of the two PET barrier films is at least one outer bus bar that is connected via an electrically conducting connection to the inner bus bar of a functional element of the at least two separate functional elements in order to electrically control the functional element separately from the other functional element or elements of the at least two separate functional elements.

2. The laminated pane according to claim 1, wherein the at least two separate functional elements are each independently selected from a PDLC functional element, a PNLC functional element, or an SPD functional element.

3. The laminated pane according to claim 1, wherein the at least two intermediate layers are each case independently formed from a polyvinyl butyral (PVB) film, an ethylene vinyl acetate (EVA) film, or a thermoplastic polyurethane (TPU) film.

4. The laminated pane according to claim 1, wherein the inner bus bars on a side of the functional element opposite a side on which the at least one outer bus bar is attached on the PET barrier film form a common bus bar.

5. The laminated pane according to claim 1, wherein when a number of the at least two separate functional elements is N, a number of outer bus bars on the PET barrier film is (N−1).

6. The laminated pane according to claim 1, wherein two or more outer bus bars are situated on the PET barrier film, wherein each outer bus bar of the two or more outer bus bars is connected via an electrically conducting connection to the inner bus bar of a respective other functional element of the at least two separate functional elements.

7. The laminated pane according to claim 1, wherein in addition to the at least one side of each functional element that is sealed using the PET barrier films, at least one further side of each functional element is sealed using PET barrier films, wherein for each further side, one or two PET barrier films are arranged partly between the one intermediate layer and an edge region of the first carrier film of this the further side and/or between the other intermediate layer and an edge region of the second carrier film of the further side.

8. A method for producing a laminated pane according to claim 1, comprising
a) providing an assembly, comprising, in this order, the outer pane, a film for an intermediate layer, at least two separate functional elements with electrically controllable optical properties, which are positioned separately from one another in a plane, a film for a further intermediate layer, and the inner pane,
    wherein the at least two separate functional elements each comprise, in this order, a first carrier film, a first surface electrode, an active layer, a second surface electrode, and a second carrier film,
    on two opposite sides of each functional element of the at least two separate functional elements, in each case, an inner bus bar is connected to the first surface electrode or to the second surface electrode of the respective functional element,
    wherein, during the arranging at one side of the two opposite sides of each functional element, two PET barrier films are arranged between the one intermediate layer and an edge region of the first carrier film or between the further and an edge region of the second carrier film such that the PET barrier films protrude beyond the first and second carrier films on said side, wherein at least one outer bus bar is attached on the protruding part of a PET barrier film,
    wherein, in a subassembly, which comprises a carrier film with at least one outer bus bar and the at least two functional elements, an inner bus bar of a functional element is electrically conductingly connected to the outer bus bar by means of a connection, and
b) connecting the outer pane and the inner pane by laminating the assembly, wherein the bonding of the pane composite is obtained by films of the intermediate layers and the respective side of the functional elements is sealed by the PET barrier films.

9. The method according to claim 8, wherein during the lamination, a negative pressure is applied to the assembly at least intermittently.

10. The method according to claim 8, wherein the at least one outer bus bar is applied on the PET barrier film by soldering or printing.

11. The method according to claim 8, wherein
a width of the PET barrier film, on which no outer bus bar is attached, is in the range from 5 to 50 mm, and/or
a width of the PET barrier film, on which at least one outer bus bar is attached, is in the range from 20 to 125 mm.

12. The method according to claim 8, wherein
the at least two films for the intermediate layers each have, independently, a thickness in the range from 0.03 mm to 0.9 mm, and/or
the first and second carrier film each have, independently, a thickness in the range from 0.03 mm, and/or
the one or more PET barrier films each have, independently, a thickness in the range from 0.02 mm to 0.2 mm.

13. The method according to claim 8, wherein
during the provision of the assembly, in addition to the arranging of the PET barrier films on one side of each functional element, at least on one further side of each functional element, one or two PET barrier films are arranged between one intermediate layer and an edge region of the first carrier film of the further side and/or between the other intermediate layer and an edge region of the second carrier film of this the further side such that the one or two PET barrier films protrude on the further side beyond the carrier films, by which means the respective side is sealed during the subsequent lamination, and/or wherein the inner bus bars on the side of the functional element, which are opposite the side on which the at least one outer bus bar is attached on the PET barrier films, are joined to form a common bus bar.

14. A method comprising manufacturing a window pane of a building, of a space in an interior of the building or a vehicle with the laminated pane according to claim 1.

15. The laminated pane according to claim 2, wherein the at least two separate functional elements are PDLC functional elements.

16. The laminated pane according to claim 3, wherein the at least two intermediate layers are formed from polyvinyl butyral (PVB) films.

17. The laminated pane according to claim 7, wherein all sides of each functional element are sealed using PET barrier films.

18. The method according to claim 11, wherein the width of the PET barrier film, on which no outer bus bar is attached, is in the range from 10 to 25 mm, and/or the width of the PET barrier film, on which at least one outer bus bar is attached, is in the range from 30 to 100 mm.

19. The method according to claim 12, wherein the first and second carrier film each have, independently, a thickness in the range from 0.04 mm to 0.2 mm, and/or the one or more PET barrier films each have, independently, a thickness in the range from 0.04 mm to 0.15 mm.

20. The method according to claim 13, wherein on all sides of each functional element, one or two PET barrier films are arranged.

* * * * *